(12) United States Patent
Chen et al.

(10) Patent No.: US 8,337,727 B2
(45) Date of Patent: Dec. 25, 2012

(54) HIGH DENSITY LITHIUM COBALT OXIDE FOR RECHARGEABLE BATTERIES

(75) Inventors: Zhaohui Chen, Fort Saskatchewan (CA); Robert Ellenwood, Sherwood Park (CA)

(73) Assignee: Umicore, Brussels (BE)

( * ) Notice: Subject to any disclaimer, the term of this patent is extended or adjusted under 35 U.S.C. 154(b) by 360 days.

(21) Appl. No.: 12/665,428

(22) PCT Filed: Jun. 10, 2008

(86) PCT No.: PCT/EP2008/004629
§ 371 (c)(1),
(2), (4) Date: Apr. 1, 2010

(87) PCT Pub. No.: WO2009/003573
PCT Pub. Date: Jan. 8, 2009

(65) Prior Publication Data
US 2010/0176352 A1    Jul. 15, 2010

Related U.S. Application Data

(60) Provisional application No. 60/929,614, filed on Jul. 5, 2007.

(30) Foreign Application Priority Data

Jun. 29, 2007 (EP) .................. 07012781
Dec. 5, 2007 (EP) .................. 07023548

(51) Int. Cl.
*H01B 1/08* (2006.01)
*C01G 51/00* (2006.01)
*H01M 4/52* (2010.01)
*H01M 4/02* (2006.01)

(52) U.S. Cl. ............. 252/518.1; 252/521.2; 429/218.1
(58) Field of Classification Search ............. 252/518.1, 252/521.2; 429/218.1
See application file for complete search history.

(56) References Cited

U.S. PATENT DOCUMENTS
6,589,694 B1 * 7/2003 Gosho et al. ............. 429/231.1
(Continued)

FOREIGN PATENT DOCUMENTS
CN    1206758    6/2005
(Continued)

OTHER PUBLICATIONS

Jiang et al., "Effects of Particle Size and Electrolyte Salt on the Thermal Stability of $Li_{0.5}CoO_2$," Electrochimica Acta, vol. 49, (2004), pp. 2661-2666.

(Continued)

*Primary Examiner* — Mark Kopec
(74) *Attorney, Agent, or Firm* — Brinks Hofer Gilson & Lione

(57) ABSTRACT

The disclosure relates to positive electrode material used for Li-ion batteries, a precursor and process used for preparing such materials, and Li-ion battery using such material in its positive electrode. The disclosure describes a higher density $LiCoO_2$ positive electrode material for lithium secondary batteries, with a specific surface area (BET) below 0.2 $m^2/g$, and a volumetric median particle size (d50) of more than 15 μm. This product has, improved specific capacity and rate-capability. Other embodiments of the disclosure are an aggregated $Co(OH)_2$, which is used as a precursor, the electrode mix and the battery manufactured using abovementioned $LiCoO_2$.

10 Claims, 3 Drawing Sheets

U.S. PATENT DOCUMENTS

Figure 1:
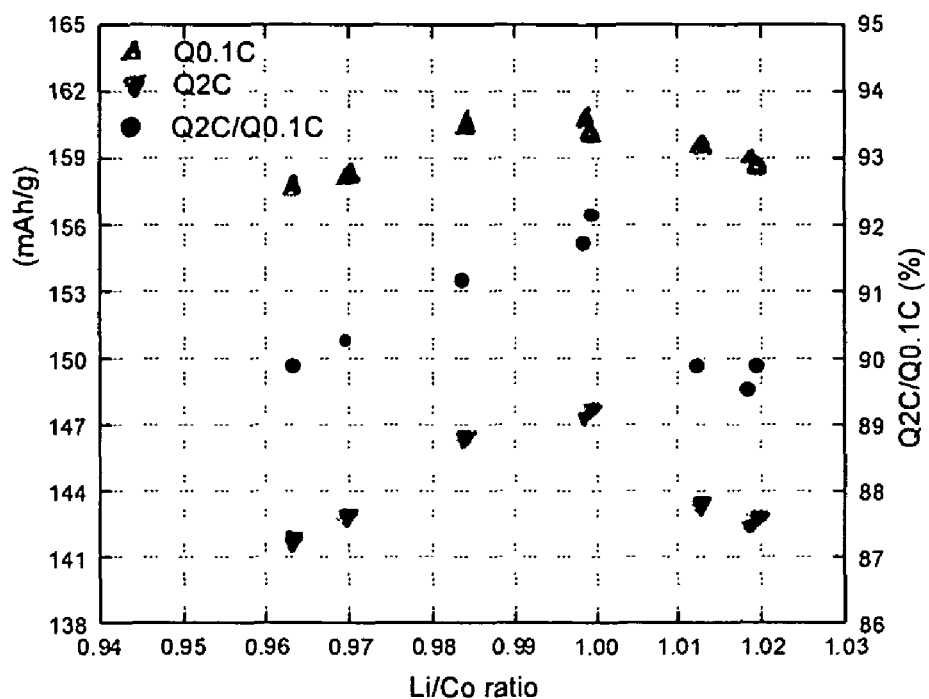

| | | |
|---|---|---|
| 6,617,073 B1 | 9/2003 | Matsumoto et al. |
| 2002/0119371 A1 | 8/2002 | Haug et al. |
| 2006/0263690 A1 | 11/2006 | Suhara et al. |
| 2007/0099087 A1 | 5/2007 | Mihara et al. |
| 2007/0264573 A1 | 11/2007 | Yamada et al. |

FOREIGN PATENT DOCUMENTS

| | | |
|---|---|---|
| CN | 1848491 | 10/2006 |
| EP | 1052716 | 11/2000 |
| EP | 1069633 | 1/2001 |
| EP | 1281673 | 2/2003 |
| JP | 9022692 | 1/1997 |
| JP | 2002321921 | 11/2002 |
| JP | 2004182564 | 7/2004 |
| WO | WO 2007037235 | 4/2007 |

OTHER PUBLICATIONS

Ying et al., "Preparation and Characterization of High-Density Spherical $LiCoO_2$ Cathode Material for Lithium Ion Batteries," Journal of Power Sources, vol. 129, (2004), pp. 264-269.

Chen et al., "Research on High Density and Safety $LiCoO_2$ as Cathode Materials for Lithium Ion Batteries," Journal of Guangdong Non-Ferrous Metals, vol. 15, Nos. 2 and 3, (Sep. 2005), pp. 419-423.

Extended European Search Report, issued in EP 07012781.6, dated Sep. 14, 2007.

International Search Report, issued in PCT/EP2008/004629, dated Dec. 8, 2008.

International Preliminary Report on Patentability, issued in PCT/EP2008/004629, dated Oct. 12, 2009.

\* cited by examiner

HIGH DENSITY LITHIUM COBALT OXIDE FOR RECHARGEABLE BATTERIES

This application is a National Stage application of International Application No. PCT/EP2008/004629, filed Jun. 10, 2008, which claims the benefit of European Patent Application No. 07012781.6, filed Jun. 29, 2007, U.S. Provisional Application No. 60/929,614, filed Jul. 5, 2007, and European Patent Application No. 07023548.6, filed Dec. 5, 2007, the entire contents of each are hereby incorporated herein by reference.

The invention relates to positive electrode material used for Li-ion batteries, a precursor and process used for preparing such materials, and Li-ion battery using such material in its positive electrode.

Compared to Ni—Cd and Ni-MH rechargeable batteries, Li-ion batteries boast an enhanced energy density, mainly due to their higher 3.6 V working voltage. Since their commercialization in 1991 by SONY, Li-ion batteries have seen their volumetric energy density increase continuously. In 1995, the capacity of a typical 18650 cylindrical cell was about 1.3 Ah. In 2006, the capacity of the same type of cell is about 2.6 Ah. Such a high energy density has enabled a wide range of applications. Li-ion batteries have become the dominant secondary battery for portable application, representing a market share of about 70% in 2006.

Such significant increase of energy density of Li-ion batteries has been initially realized by optimizing cell design, accommodating more active electrode materials in a fixed volume cell. Later efforts concentrated on improving the energy density of the electrodes. Using a high density active electrode material is one way to achieve this goal. As $LiCoO_2$ still continues to be used as positive electrode material for the majority of commercial Li-ion batteries, a highly dense variety of this material is in demand.

The tap density of electrode materials is usually a good indicator of electrode density. However, in some cases, a high tap density does not guarantee a high electrode density. For example, as demonstrated by Ying et al. (Journal of power Sources, 2004) or in CN1206758C, the tap density of a $LiCoO_2$ powder with large secondary spherical particle size, but small primary size, can be as high as 2.8 $g/cm^3$. However, because of its small primary particle size, and possibly because of voids in the secondary particles, the obtained electrode density is not correspondingly high. For this reason, density of electrode materials should preferably be measured under a pressure similar to the industrial conditions prevailing during actual electrode manufacture, instead of by tapping. In this invention, density therefore refers to press density, and not to tap density.

The theoretical density of $LiCoO_2$ is about 5.1 $g/cm^3$. For actual $LiCoO_2$ powders, factors that impact the density are a.o. the shape of particles, the size of primary particles and the particle size distribution. In today's industry, the medium primary particle size of $LiCoO_2$ used for different application is in the range of 1 to 20 μm. Generally, the larger the median primary particle size (d50), the higher is the press density. In addition, as proposed in CN1848491A, electrode density can be increased further by mixing larger $LiCoO_2$ particles with 15 to 40 wt % of finer particles.

Besides density reasons, a large median primary particle size is also desirable for safety purposes, especially for large cells such as the 18650 model cylindrical cells that are used in laptop computer. During charge, lithium atoms in $LiCoO_2$ are partially removed. $LiCoO_2$ becomes $Li_{1-x}CoO_2$ with x>0. At high temperatures caused by certain abuse condition, $Li_{1-x}CoO_2$ tends to decompose and then to release $O_2$. The released $O_2$ easily reacts with organic solvent in the battery electrolyte, resulting in fire or explosion of the battery. Using $LiCoO_2$ with a large median primary particle size and low specific surface area (BET) reduces these risks, as pointed out by Jiang J. et al. (Electrochimica Acta, 2004).

Therefore, for both safety and energy density reasons, $LiCoO_2$ with large median primary particle size, such as 15 μm or above, is preferred, in particular for large Li-ion cells. Materials with a large mass median primary particle size (d50) have also a relatively low BET. A d50 larger than 15 μm typically leads to a BET below 0.2 $m^2/g$.

In a usual manufacture process of $LiCoO_2$, powderous $Co_3O_4$ and $Li_2CO_3$ are mixed and then fired at a temperature ranging from 800° C. to 1100° C. The d50 of the $Co_3O_4$ needs to be relatively small, usually below 5 μm, to ensure a sufficient reactivity. The growth of the $LiCoO_2$ particles is controlled by the firing temperature and time, and by the amount of excess Li (added as $Li_2CO_3$). To make $LiCoO_2$ with a d50 larger than 15 μm, at least 6 at. % of excess Li per Co atom is needed, as this excess favours crystal growth. However, part of the excess Li also enters the $LiCoO_2$ structure. Therefore, the final product will be Li over-stoichiometric. This is why all current $LiCoO_2$ material with large primary particle size (or a low BET, which is equivalent) is significantly over-stoichiometric. Due to this excess Li in their structure, such materials have a lower capacity because some active $Co^{3+}$ has been replaced by inactive $Li^+$. In this respect, it should be noted that in this application, $LiCoO_2$ is used to designate a wide variety of lithium cobalt oxides having stoichiometries that may slightly deviate from the theoretical.

One example of this process can be found in EP 1 281 673 A1. Here a composition $LiCo_{(1-x)}Mg_xO_2$ is disclosed, wherein x is 0.001 to 0.15, and having an average particle diameter of 1.0 to 20 μm and a BET of 0.1 to 1.6 $m^2/g$. However, the examples clearly show that the inventor did not succeed in manufacturing a lithium cobalt (magnesium) oxide powder having both of: a d50 of more than 15 μm, and a specific surface area (BET) of less than 0.2 $m^2/g$. The maximum d50 achieved in this document is 8.3 μm in a comparative example.

It is finally also desirable for electrode materials to provide good rate capability. Rate capability is defined as the ratio of specific discharge capacity at a higher discharge rate (typically 2 C), to the specific discharge capacity at a lower rate (typically 0.1 C). Unfortunately, current $LiCoO_2$ with large primary particle size shows relatively poor rate capability, as shown in JP3394364 and by Chen Yan-bin et al. (Guangdong Youse Jinshu Xuebao, 2005). Such poor rate capability is considered to be related to the longer Li diffusion path for material with larger primary particle size when Li is removed or reinserted during charge or discharge.

In summary, $LiCoO_2$ with a large primary particle size is preferred for Li-ion battery for improved safety and energy density. However, current large particle size powders show sub-optimal capacity and rate capability because of the significant Li-excess in their structure.

A first principal objective of this invention is therefore to provide a relatively coarse-grained electrochemically active $LiCoO_2$ powder, without significant Li-excess.

The first active product embodiment of the invention concerns a lithium cobalt oxide powder for use as an active positive electrode material in lithium-ion batteries, having a d50 of more than 15 μm, a BET of less than 0.2 $m^2/g$, and a Li to Co atomic ratio between 0.980 and 1.010, preferably of less than 1.000, more preferably of less than 0.999. The mentioned particle size is evidently a primary particle size, and the particles are neither agglomerated or coagulated, nor aggregated.

This Li to Co ratio range is chosen so that such composition gives a discharge capacity of more than 144 mAh/g at 2 C, and rate capability (Q2 C/Q0.1 C) of more than 91%. For product with an Li to Co ratio lower than 0.980, electrochemically inactive and thus undesired $Co_3O_4$ has been identified with X-ray diffraction.

It should be mentioned that in US 2002/119371 A1 an electrochemically active material is used, having the formula of a ternary (Li-Me1-O) or quaternary (Li-Me1-Me2-O) lithium transition metal oxides, wherein Me1 and Me2 are selected from the group consisting of Ti, V, Cr, Fe, Mn, Ni, Co. It can further comprise up to about 15 atom percent of Mg, Al, N or F to stabilize the structure, and have a BET of 0.1-2 $m^2$/g and a particle size of from about 1 to about 50 µm. However, the ratio Li/Co is said to be in the wide range of 0.98 to about 1.05, without giving a more specific example.

Also, in EP 1 052 716 A2 a Li-transition metal composite oxide $Li_AM_{(1-x)}Me_xO_2$ is disclosed, with M being Co, Ni, Mn, V, Ge and the like, and preferably $LiCoO_2$, where A is 0.05-1.5, preferably 0.1-1.1, and x can be zero. This composite oxide preferably has an average particle size of 10-25 µm, and also preferably has a BET of 0.1-0.3 $m^2$/g. In the examples (Table 1) however, the combination of average particle size above 15 µm and BET under 0.2 $m^2$/g is not disclosed together with a Li/Co atomic ratio between 0.980 and 1.010.

The second active product embodiment of the invention concerns a lithium cobalt oxide powder for use as an active positive electrode material in lithium-ion batteries, having a d50 of more than 15 µm, a BET of less than 0.2 $m^2$/g, and with an $OH^-$ content between 0.010 and 0.015 wt % more preferably between 0.0125 and 0.015.

This $OH^-$ range was found to correspond to the nearly stoichiometric products delivering the optimal electrochemical performances. By $OH^-$ content is meant the $OH^-$ as determined by acid-base titration of an aqueous dispersion of the lithium cobalt oxide powder. Titration is performed using a 0.1 M HCl solution. As some carbonates could be present, the relevant amount of acid is calculated as the amount of acid to reach pH 7, minus the amount of acid to reach pH 4 from pH 7.

It should be mentioned here that in US 2006/263690 A1 a positive electrode material $Li_pCo_xM_yO_zF_a$ is claimed, where $0.9 \leq p \leq 1.1$, y and a may be zero (and x=1), $1.9 \leq z \leq 2.1$. D50 is from 5 to 15 µm (although also up to 20 µm is mentioned singularly), and BET from 0.3 to 0.7 $m^2$/g. This lithium composite oxide has a remaining alkali amount of at most 0.02, and preferably at most 0.01 wt %. All of the examples show a combination of a BET value over 0.2 $m^2$/g, and a D50 under 15 µm.

In WO99/49528 (equivalent to EP 1 069 633 A1) on the other hand, a LiCoO2 is disclosed which comprises a mixture of primary particles of small crystals having a Feret's diameter in a projection drawing by SEM observation in a range from 0.4 to 10 µm and an average diameter of 5 µm or less, and secondary particles formed by 'gathering' of the primary particles and having a diameter of 4 to 30 µm, wherein the mole ratio of Co to Li is 0.97 to 1.03, and at least a part of small crystals constituting the secondary particles are joint by the junction through sintering, and the secondary particles are in the shape of a circle or an ellipse. This material is preferably obtained by mixing a lithium salt and a cobalt source where cobalt oxyhydroxide (CoOOH) is used as a raw material and comprises secondary particles falling in the range of 4 to 30 µm and formed by gathering of a number of primary particles of 0.2 to 0.8 µm and subsequently, by carrying out a heat treating on this mixture.

The characteristics of both the first and second embodiments of the invention mentioned before can advantageously be combined.

The above mentioned dependency of capacity and rate capability on the Li to Co ratio is also applicable to doped products, in particular for Mg-doped $LiCoO_2$. A third active product embodiment is therefore a lithium cobalt oxide powder for use as an active positive electrode material in lithium-ion batteries according to embodiments 1 and 2, further comprising Mg as doping elements with a Mg to Co atomic ratio between 0.001 to 0.05. However, in this case, it is the atomic ratio of Li to the sum of Co and Mg (instead of to Co alone) that should be between 0.980 and 1.010, and be preferably less than 1.000, and more preferably less than 0.999.

As described above, mixing relatively coarse lithium cobalt oxide powder with finer powder can further increase the electrode density. Therefore, the fourth active product embodiment of this invention is defined a powder mixture for use as an active positive electrode material in lithium-ion batteries, comprising at least 50% by weight of a first powder according to any one of embodiments one to three, and comprising a second powdered active component consisting of lithium transition-metal oxide. The said second powder should preferably be finer than said first powder, and, in particular result in a powder mixture showing a bimodal particle size distribution.

Such a bimodal powder mixture should preferably comprise an electrochemically active second powder, consisting of lithium cobalt oxide, the mixture having a BET of less than 0.5 $m^2$/g.

A second principal objective of this invention is to provide an economical precursor that can be used to manufacture the invented products effectively and economically.

Usually, $LiCoO_2$ is made by solid state reaction of $Co_3O_4$ as a Co source with $Li_2CO_3$ as a Li source.

As explained above, the customary use of $Co_3O_4$ as a precursor for $LiCoO_2$ has been found to imply the addition of excess Li when large particle sizes are sought, this excess resulting in undesired side effects, such as reduced capacity and rate capability. Moreover, and from the point of view of process robustness, it appears that the mass median primary particle size (d50) of the $LiCoO_2$ product is very sensitive to variations of the firing temperature and of the Li-excess. Indeed, a 10° C. variation in firing temperature causes a d50 change of 2 to 3 µm, and a 1% variation in Li causes a d50 change of 2 to 4 µm. Therefore, using $Co_3O_4$, a very strict control of the Li to Co blending ratio and of the firing temperature is required in order to obtain a consistent result. Such a control is difficult to ensure, in particular when production is envisaged at an industrial scale.

This problem does not occur when using a specially prepared aggregated $Co(OH)_2$ as a precursor. Moreover, $Co_3O_4$ is relatively expensive compared to other alternatives such as $Co(OH)_2$. To reduce costs, $Co(OH)_2$ has therefore already been proposed to replace $Co_3O_4$ as a cheaper Co source, as for example in JP2002321921. However, two firing steps are needed according to the described process. Due to the high costs of such a double firing process, the total savings remain limited.

According to the inventors' results, the shape of the aggregated $Co(OH)_2$ precursor particles can be preserved after firing with a Li precursor. The secondary particle size of the end product is only slightly smaller than that of aggregated Co(OH)$_2$ precursor. The primary particle size of LiCoO$_2$ still depends on the firing conditions, such as Li to Co ratio, firing temperature and firing time.

With the invented aggregated precursor, using a suitable blending ratio of Li to Co, and a single firing step, the primary particles in the end product grow larger, while there is little change in secondary particle size. Under certain conditions, such as with a blending ratio of Li to Co between 1.04 and 1.06, and a firing temperature in the range of 960 to 1020° C., the primary particles forming the secondary structure can indeed grow together. In this way, and by using aggregated Co(OH)$_2$, the products mentioned in the aforementioned embodiments can be prepared cost effectively.

A precursor product according to this invention is thus defined as either one or more of an non-sintered agglomerated powderous cobalt oxide, hydroxide and oxy-hydroxide, having a secondary particle size with a d50 of more than 15 μm. Preferably the primary particles have a primary particle size with a d50 of less than 5 μm. The secondary particles preferably have a spherical shape. The cobalt oxide can either be Co$_3$O$_4$, Co$_2$O$_3$, or a partially oxidized and dried Co(OH)$_2$. It is important that the secondary particles of the precursor do not contain any sintered primary particles, since the desired result can only be obtained using a single firing step.

A third principal objective of this invention concerns a process for manufacturing the invented active products, starting from the invented precursor products.

To this end, a process is defined whereby the Co precursor is mixed with Li source, according to a Li to Co ratio in the range between 1.04 and 1.06, and firing the mixture with a single firing at temperature between 960° C. and 1020° C. This single-firing process comprises the steps of:

providing for a precursor compound as described above,
mixing said precursor compound with a Li source according to a Li to Co ratio R between 1.04 and 1.06, and
firing said mixture with a single firing at a temperature T between 960° C. and 1020° C., whereby the quotient Q of the firing temperature T and the Li to Co ratio R corresponds to 920≦Q≦965. When 1.04≦R≦1.05, then preferably 920≦Q≦960, and more preferably 925≦Q≦945. When 1.05<R≦1.06, then preferably 925≦Q≦965, and more preferably 945≦Q≦960.

Another objective of the invention is to provide Li-ion batteries with increased energy density and rate capability. With the product mentioned in the first embodiment, the capacity and rate capability of a cell with certain volume can be increased. Therefore the energy density and rate capability can be improved.

Finally, this invention also concerns Li-ion batteries that use the product mentioned in the abovementioned active product embodiments, as positive electrode materials.

The following figures illustrate the invention.

FIG. 1: Discharge capacity and rate capability vs. the Li to Co ratio for LiCoO$_2$ with a BET of 0.15 to 0.18 m$^2$/g and a d50 of 15.7 to 18.2 μm.

Figure 2:
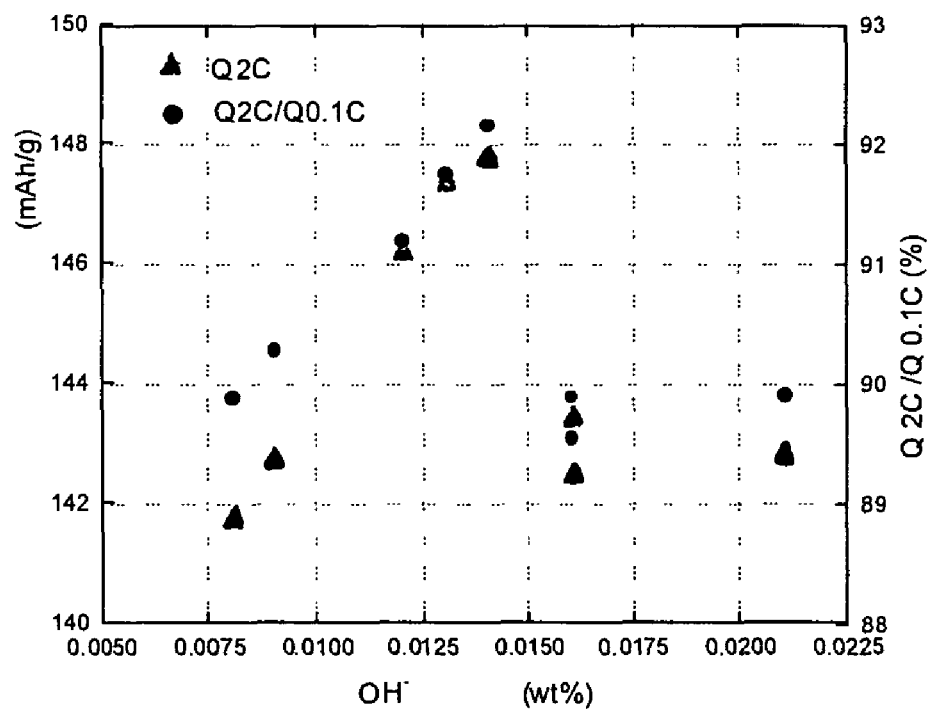

FIG. 2: Discharge capacity and rate capability vs. OH$^-$ content for LiCoO$_2$ with a BET of 0.15 to 0.18 m$^2$/g and a d50 of 15.7 to 18.2 μm.

Figure 3:
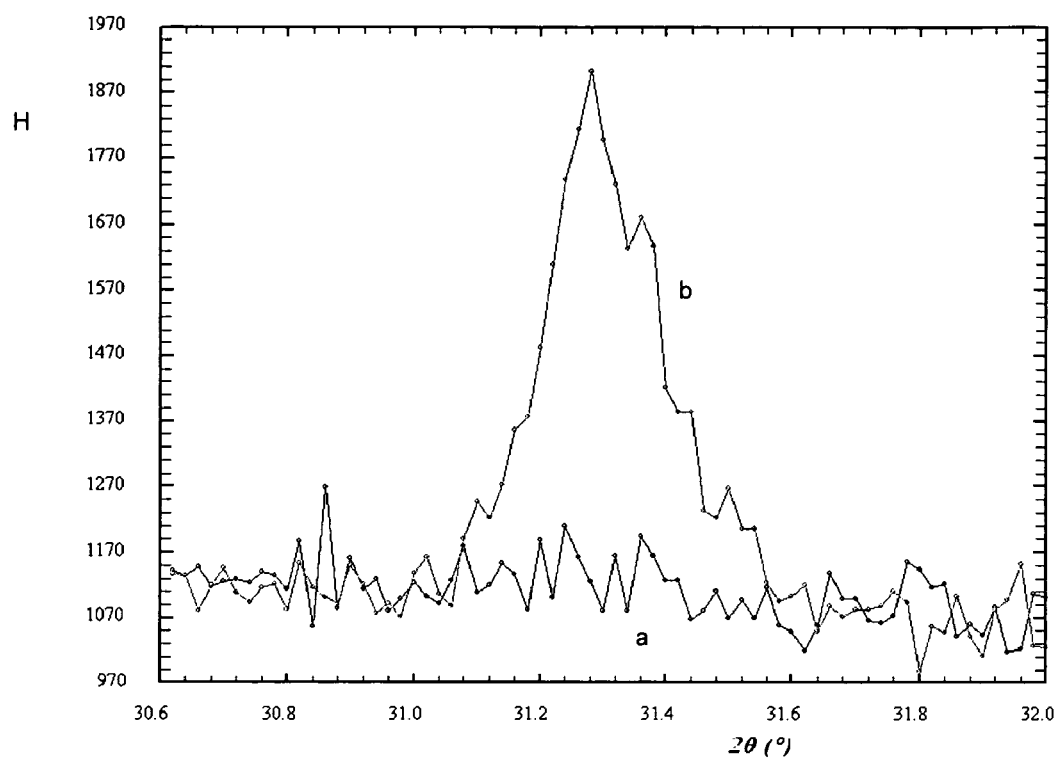

FIG. 3: XRD diffraction pattern of Example 1 (a) and Comparative Example 2 (b).

Figure 4:
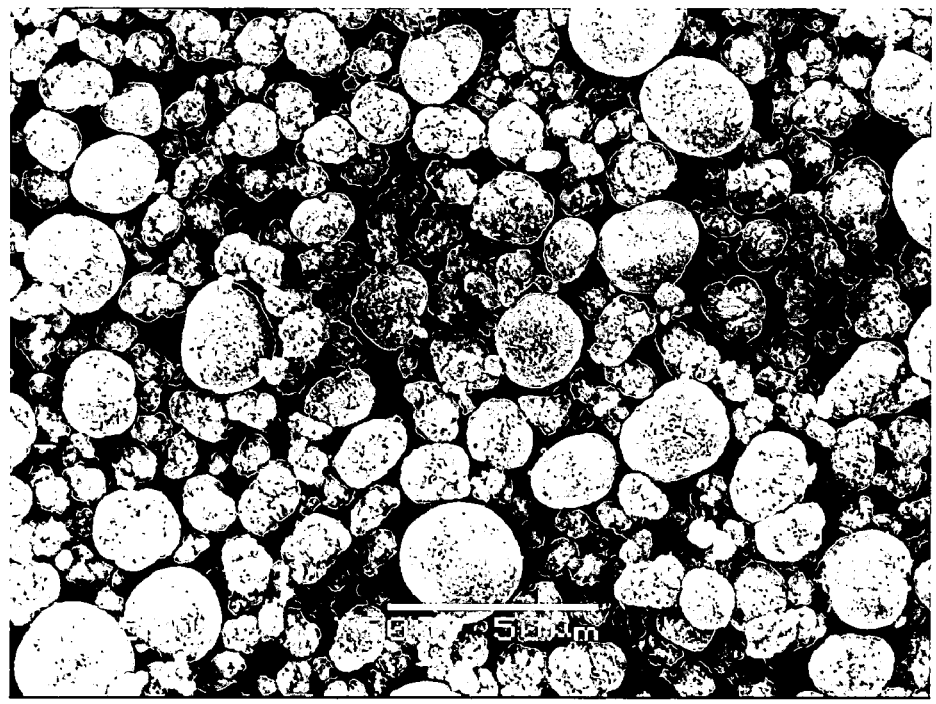

FIG. 4: SEM image of the aggregated precursor used in Examples 1, 2, and 3.

Figure 5:
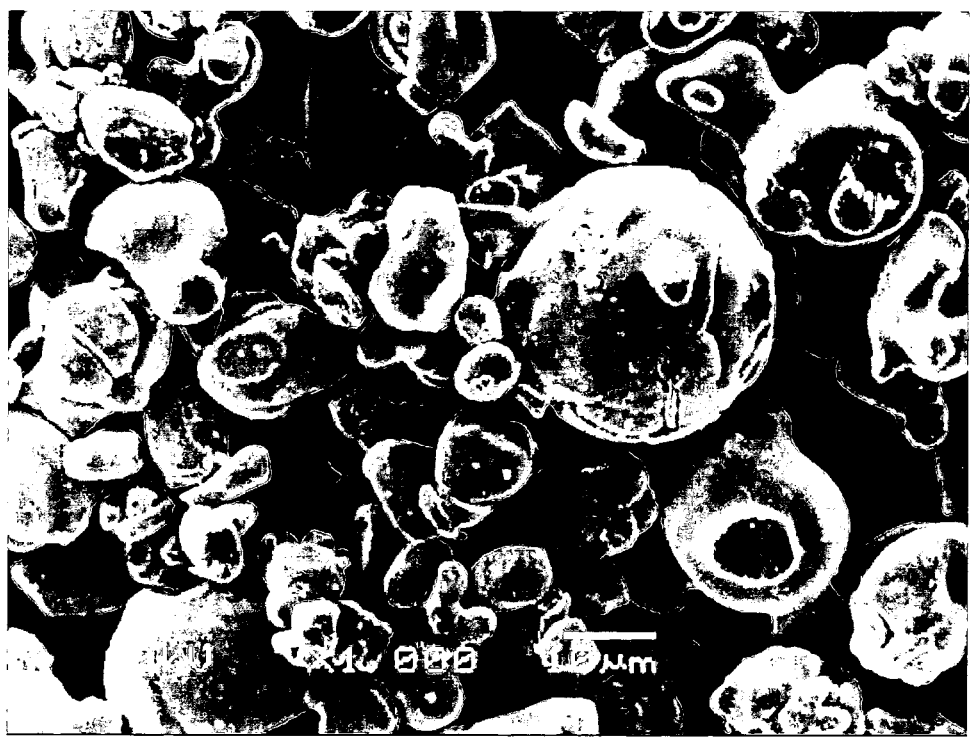

FIG. 5: SEM image of final product according to Example 1.

Figure 6:
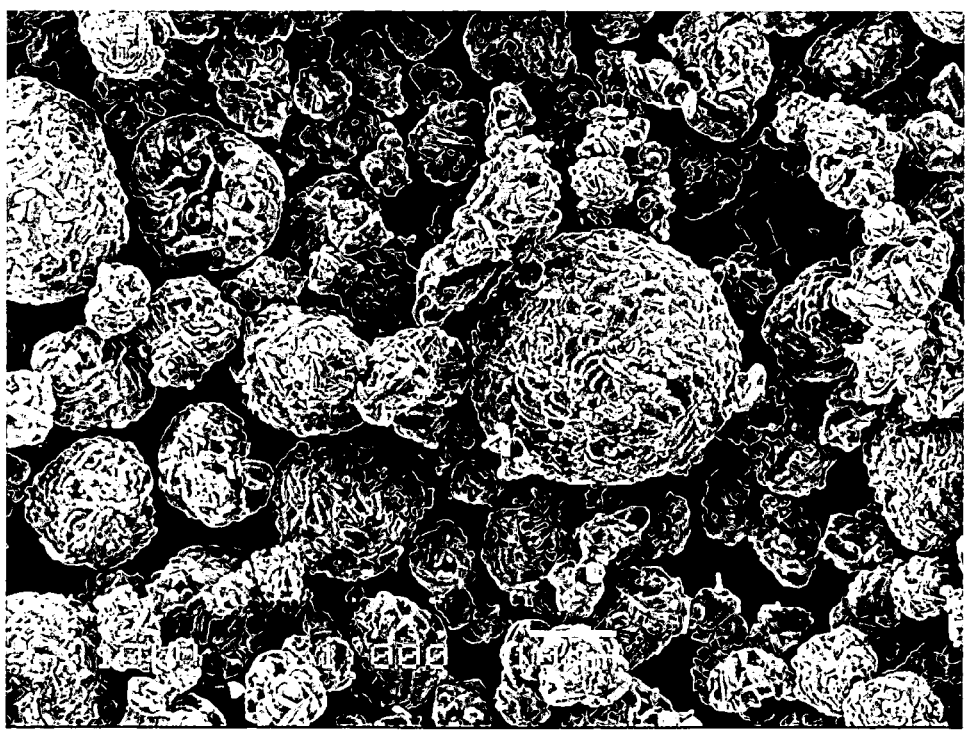

FIG. 6: SEM image of final product according to Comparative Example 3.

Products with similar medium particle size (in the range of 15.7 μm to 18.2 μm) and similar BET (in the range of 0.15 m$^2$/g to 0.18 m$^2$/g) but with various Li to Co ratios (in the range of 0.95 to 1.02) were prepared. Particle size and specific surface area of all products studied were kept nearly constant. The Li diffusion path lengths for the different products are therefore comparable. The variation in discharge capacity (Q) at low rate (0.1 C) and at high rate (2 C) amongst the products therefore can be attributed to variation of the Li to Co ratio. According to electrochemical results, as shown in FIG. 1, products with a Li to Co ratio in the range of 0.980 to 1.010 offer optimal characteristics: a high capacity with only a limited decrease at high rate, corresponding to a rate capability (ratio of Q@0.1 C to Q@2 C) of more than 91%. With lower Li to Co ratios, products have less capacity, probably due to the appearance of inactive Co$_3$O$_4$ impurities. For example, a significant X-ray diffraction peak of Co$_3$O$_4$ was found in the diffraction pattern of a product with a ratio of 0.970. On the other hand, products with too high Li to Co ratios lose some of their charge-discharge capacity, probably because of the substitution of active Co$^{3+}$ by inactive Li$^+$.

FIG. 2 shows a similar correlation as a function of the OH$^-$ content for the same samples used in FIG. 1. The optimal OH$^-$ range is 0.010 to 0.015 wt %. As OH$^-$ content increases, the rate capability initially increases. However, as it increases beyond 0.015 wt %, the rate capability sharply degrades.

EXAMPLES

The present invention is described in more detail by examples and comparative examples below. However, the examples are only illustrative, and, therefore, not intended to limit the scope of the present invention.

To prepare Co(OH)$_2$ or Mg-doped Co(OH)$_2$, a suitable Co$^{2+}$ salt, preferably CoSO$_4$.6H$_2$O, is dissolved in water. The so obtained solution typically contains about 55 g/L of Co. Co(OH)$_2$ is then precipitated by adding an aqueous base, preferably a solution of 25% NaOH, and a 260 g/L NH$_3$ to the Co solution into a stirred and heated, preferably to 62° C., overflow reactor tank. The reactor tank is typically filled with a seed slurry of Co(OH)$_2$ containing NaOH, Na$_2$SO$_4$, ammonia, and water. As the reaction proceeds, the resulting overflow slurry is collected, and a pink solid is separated from the supernatant by filtration. After washing with water, the solid is dried in a convection oven to a constant mass. The resulting powder is a highly pure, spheroidal, flowable, oxidation resistant Co(OH)$_2$ that is easily screened and processed.

Mg-doped Co(OH)$_2$ is produced under similar conditions as the above pure Co(OH)$_2$. The only difference is that instead of using a feed solution of pure CoSO$_4$, the feed solution is supplemented with a suitable Mg$^{2+}$ salt, preferably MgSO$_4$.

During the precipitation reaction, pH (temperature uncompensated) is maintained between 10.4 and 11.3, preferably between 10.8 and 11.0. In general, a higher pH will result in the precipitation of smaller secondary particles, while a lower pH will result in the precipitation of larger secondary particles. The resulting spherical Co(OH)$_2$ has d50 particle size volume distribution values between 5 and 50 μm and spans (defined as (d90-d10)/d50) ranging from 0.5 to 2.0. More precisely, the steady state production of Co(OH)$_2$ will result in D50 particle sizes ranging from 14 to 21 μm with spans ranging from 0.9 to 1.2. Alternatively, a less spherical agglomerated Co(OH)$_2$ material can be produced by increasing the pH. This material retains water more easily and has steady state d50 particle sizes ranging from 4-14 μm with spans typically greater than 1.0.

Particle size distribution of LiCoO$_2$ is measured using a Malvern Mastersizer 2000. The median volumetric particle size is assumed to be equivalent to the median mass particle size represented by d50. The specific surface area of LiCoO$_2$ is measured with the Brunauer-Emmett-Teller (BET) method using a Micromeritics Tristar. To measure the press density of LiCoO$_2$, a mixture is made with 95 wt % active material, 2.5 wt % carbon black, and 2.5 wt % polyvinylidene fluoride (PVDF) in N-methylpyrrolidone (NMP). After drying, 1.2 g powder is put in a SPEX 3613 13 mm die set and pressed under 3.7 metric ton per cm$^2$. Press density is calculated by dividing the mass by the volume of the pressed pellet. The OH$^-$ content of fired LiCoO$_2$ is measured by pH titration in water with a 0.1 M HCl solution.

Electrochemical performance is tested in coin type cells, with a Li foil as counter electrode in a lithium tetrafluoroborate (LiBF$_4$) type electrolyte at 24° C. Cells are charged to 4.3 V and discharged to 3.0 V. A specific capacity of 160 mAh/g is assumed for the determination of the discharge rates. For example, for discharge at 2 C, a specific current of 320 mA/g is used.

Example 1

A mixture is made with aggregated Co(OH)$_2$ with a d50 of 19.3 μm and Li$_2$CO$_3$ with a Li to Co (atomic) blending ratio of 1.05. The mixed powder is fired in air at 980° C. for 12 hours. After cooling, the obtained material is milled and screened with a 270 mesh screen.

Example 2

Same as example 1, except that the firing temperature is 970° C.

Example 3

A mixture is made with aggregated Co(OH)$_2$ with a d50 of 19.3 μm and Li$_2$CO$_3$ with a Li to Co blending ratio of 1.04. The mixed powder is fired in air at 990° C. for 10 hours. After cooling, the obtained material is milled and screened with a 270 mesh screen.

Example 4

A mixture is made with aggregated (Co$_{0.99}$Mg$_{0.01}$)(OH)$_2$ with a d50 of 18.7 μm, which is dried at 175° C. for 5 hours, and Li$_2$CO$_3$ with a Li to (Co$_{0.99}$Mg$_{0.01}$) blending ratio of 1.05. The mixed powder is fired in air at 980° C. for 12 hours. After cooling, the obtained material is milled and screened with a 270 mesh screen.

Example 5

Product from Example 3 is mixed with commercially available Cellcore® D5 (Umicore, Belgium) in a 80 to 20 weight ratio. Cellcore® D5 has a d50 of 6.5 μm, which is smaller than the product from Example 3 (17.4 μm). The press density of the mixed powder is 3.83 g/cm$^3$, which is higher than that of Example 3 (3.79 g/cm$^3$).

Comparative Example 1

A mixture is made with Co$_3$O$_4$ with a d50 of 3 μm and Li$_2$CO$_3$ with a Li to Co blending ratio of 1.065. The mixed powder is fired in air at 960° C. for 12 hours. After cooling, the obtained material is milled and screened with a 270 mesh screen.

Comparative Example 2

A mixture is made with aggregated Co(OH)$_2$ with a d50 of 19.3 μm and Li$_2$CO$_3$ with a Li to Co blending ratio of 1.035. The mixed powder is fired in air at 1020° C. for 10 hours. After cooling, the obtained material is milled and screened with a 270 mesh screen.

Comparative Example 3

A mixture is made with aggregated Co(OH)$_2$ with a d50 of 19.3 μm and Li$_2$CO$_3$ with a Li to Co blending ratio of only 1.005. The mixed powder is fired in air at 920° C. for 12 hours. After cooling, the obtained material is milled and screened with a 270 mesh screen.

Comparative Example 4

A mixture is made with aggregated Co(OH)$_2$ with a d50 of only 9 μm and Li$_2$CO$_3$ with a Li to Co blending ratio of 1.06. The mixed powder is fired in air at 960° C. for 12 hours. After cooling, the obtained material is milled and screened with a 270 mesh screen.

Comparative Example 5

A mixture is made with Mg-doped Co$_3$O$_4$ (Co to Mg ratio of 99:1) with a d50 of 3 μm and Li$_2$CO$_3$ with a Li to Co blending ratio of 1.057. The mixed powder was fired in air at 960° C. for 15 hours. After cooling, the obtained material is milled and screened with a 270 mesh screen.

Comparative Example 6

A mixture is made with aggregated Co(OH)$_2$ with a d50 of 19.3 μm and Li$_2$CO$_3$ with a Li to Co blending ratio of 1.06. The mixed powder is fired in air at 960° C. for 12 hours. After cooling, the obtained material is milled and screened with a 270 mesh screen.

Comparative Example 7

A mixture is made with aggregated Co(OH)$_2$ with a d50 of 19.1 μm and Li$_2$CO$_3$ with a Li to Co blending ratio of 1.07. The mixed powder is fired in air at 950° C. for 10 hours. After cooling, the obtained material is milled and screened with a 270 mesh screen.

Physical properties and selected electrochemical results for examples and comparative examples are listed in Table 1. Even though different Li to Co ratios and temperatures are used for the Examples 1 to 3, the d50 of the particles are about the same, in the range of 17.0 to 17.4 μm. This large particle size is reflected by the low BET, which is 0.17 m$^2$/g or below. With such a large particle size, all three examples give high press density, around 3.77 g/cm$^3$. Regarding chemical composition, they have a Li to Co ratio of almost one. Their OH$^-$ contents are in the range of 0.012 to 0.014 wt %. They have excellent discharge capacity at 2 C rate, as well as excellent rate capability.

In Comparative Example 1, Co$_3$O$_4$ is used as a precursor. The obtained LiCoO$_2$ has a smaller d50 than in Example 2, where Co(OH)$_2$ was used, even though a higher Li to Co ratio was chosen in the blend. This results in a high Li-excess in the final product. This excess penalizes the rate capability, which is poor compared to Example 2, even though the particle size is slightly smaller. Probably due to its wider particle size distribution, the product has a slightly higher press density.

The powder according to Comparative Example 2 is made at a relatively high temperature, but at a low blending ratio. The obtained powder therefore has a significant Li deficit. Its OH$^-$ content is only 0.008 wt %. In this case, there is Co$_3$O$_4$ present as an impurity in the product. This is clearly shown in FIG. 3, where the product according to Example 1 is shown for reference.

The powder of Comparative Example 3 is prepared starting from the same $Co(OH)_2$ precursor as in Examples 1 to 3, but with a lower Li to Co ratio and a lower firing temperature. The product still has d50 of 17 μm, which is just slightly smaller than the 19.3 of the $Co(OH)_2$. However, this product has a low press density of only 3.52 g/cm$^3$, because of its small primary particles and ensuing high BET of 0.45 m$^2$/g. This example demonstrates that a large primary particle size is needed to obtain a high density $LiCoO_2$.

The powder of Comparative Example 4 is prepared starting from $Co(OH)_2$ precursor with badly formed secondary particles. Even it is blended and fired in the same conditions as Example 2, it has a d50 of only 9.8 μm and a low press density of 3.63 g/cm$^3$. To make high density material with such a precursor having a small secondary particle size, a high Li to Co blending ratio is needed. This is not recommended because the so obtained $LiCoO_2$ will end up with a too high Li excess. Therefore, to make $LiCoO_2$ with a large primary particle size, $Co(OH)_2$ with large secondary particle size is needed.

In Table 3 the process characteristics are investigated. In fact, to obtain the stoichiometric high density $LiCoO_2$ according to the invention, the correct combination of blending ratio R (=Li/Co) and firing temperature T should be respected, as listed in the following table.

TABLE 3

| | R vs T diagram | | | | |
|---|---|---|---|---|---|
| | | | R | | |
| T | 1.04 | 1.045 | 1.05 | 1.055 | 1.06 |
| 960 | ✓ | | Over | Over | Over |
| 970 | ✓ | ✓ | ✓ | Over | Over |
| 980 | ✓ | ✓ | ✓ | ✓ | Over |
| 990 | ✓ | ✓ | ✓ | ✓ | ✓ |
| 1000 | Under | ✓ | ✓ | ✓ | ✓ |
| 1010 | Under | Under | | ✓ | ✓ |
| 1020 | Under | Under | Under | | ✓ |

In the table, "Over" means that an excess of Li is used for a firing temperature that is too low. On the contrary, "Under" stands for firing at a temperature which is too high for the given Li/Co ratio. For "✓" the correct conditions are used.

TABLE 1

| | Precursor | | Blend | | Product | | | | | | |
|---|---|---|---|---|---|---|---|---|---|---|---|
| | Type | d50 (μm) | Li to Co (at./at.) | Firing (° C.) | Li to Co (at./at.) | OH$^-$ (wt %) | d50 (μm) | BET (m$^2$/g) | Density (g/cm$^3$) | Q2C (mAh/g) | Rate (%) |
| Ex. 1 | $Co(OH)_2$ | 19.3 | 1.05 | 980 | 0.998 | 0.013 | 17.4 | 0.15 | 3.76 | 147.4 | 91.8 |
| Ex. 2 | $Co(OH)_2$ | 19.3 | 1.05 | 970 | 0.999 | 0.014 | 17.0 | 0.17 | 3.75 | 147.8 | 92.2 |
| Ex. 3 | $Co(OH)_2$ | 19.3 | 1.04 | 990 | 0.984 | 0.012 | 17.4 | 0.14 | 3.79 | 146.2 | 91.2 |
| Comp Ex. 1 | $Co_3O_4$ | 3 | 1.065 | 960 | 1.016 | 0.018 | 13.9 | 0.19 | 3.79 | 141.0 | 88.9 |
| Comp Ex. 2 | $Co(OH)_2$ | 19.3 | 1.035 | 1020 | 0.963 | 0.008 | 17.8 | 0.16 | 3.76 | 141.7 | 89.9 |
| Comp Ex. 3 | $Co(OH)_2$ | 19.3 | 1.005 | 920 | | | 17 | 0.45 | 3.52 | | |
| Comp Ex. 4 | $Co(OH)_2$ | 9 | 1.06 | 960 | | | 9.8 | | 3.63 | | |
| Comp Ex. 6 | $Co(OH)_2$ | 19.3 | 1.06 | 960 | 1.019 | 0.021 | 18.2 | 0.16 | 3.78 | 142.8 | 89.9 |
| Comp Ex. 7 | $Co(OH)_2$ | 19.1 | 1.07 | 950 | 1.025 | 0.041 | 23.2 | 0.13 | 3.78 | 140.6 | 89.2 |

Table 2 lists results related to Mg-doped products. The product according to Example 4 has about the same density as the product according to Comparative Example 5. With a Li to Co-plus-Mg ratio close to 1.0, Example 4 boasts a higher capacity and a better rate capability than Comparative Example 5.

TABLE 2

| | Precursor | | Blend | | Product | | | | | |
|---|---|---|---|---|---|---|---|---|---|---|
| | | | | | Li to | | | | | |
| | Type | d50 (μm) | Li to Co (at./at.) | Firing (° C.) | (Co + Mg) (at./at.) | d50 (μm) | BET (m$^2$/g) | Density (g/cm$^3$) | Q2C (mAh/g) | Rate (%) |
| Ex. 4 | $Co(OH)_2$ Co/Mg = 99 | 18.7 | 1.05 | 980 | 0.996 | 20.1 | 0.18 | 3.79 | 137.2 | 87.5 |
| Comp Ex. 5 | $Co_3O_4$ Co/Mg = 99 | 3 | 1.057 | 980 | 1.017 | 17.3 | 0.16 | 3.78 | 134.8 | 86.8 |

Example 5 is the result of mixing powder from Example 4 with 20% of LiCoO2 with a smaller d50. Press density increases from 3.79 g/cm$^3$ to 3.83 g/cm$^3$.

The invention claimed is:

1. A lithium cobalt oxide powder for use as an active positive electrode material in lithium-ion batteries, having a d50 of more than 15 μm, a specific surface area (BET) of less than 0.2 m$^2$/g, a Li to Co atomic ratio between 0.980 and 1.010, and an OH$^-$ content between 0.010 and 0.015 wt %.

2. The lithium cobalt oxide powder of claim 1, further comprising Mg as a doping element, having a Mg to Co atomic ratio between 0.001 and 0.05, and having a Li to the sum of Co and Mg atomic ratio between 0.980 and 1.010.

3. A powder mixture for use as an active positive electrode material in lithium-ion batteries, comprising at least 50% by weight of a first powder, wherein the first powder is the lithium cobalt oxide powder of claim 1, and a second powderous active component consisting of a lithium transition-metal oxide.

4. The powder mixture of claim 3, wherein the median particle size of the second powderous active component is smaller than that of the first powder, and wherein the particle size distribution of the powder mixture is multi modal.

5. The powder mixture of claim 4, wherein the second powderous active component consists of lithium cobalt oxide, the mixture having a BET of less than 0.5 m$^2$/g.

6. An electrode mix comprising the powder of claim 1 as an active material.

7. A lithium-ion battery comprising the electrode mix of claim 6.

8. A single firing process for manufacturing the lithium cobalt oxide powder of claim 1, comprising:
   providing a precursor compound consisting of either one or more powderous non-sintered agglomerated cobalt oxide, hydroxide and oxyhydroxide having a secondary particle size d50 or more than 15 μm,
   mixing said precursor compound with a Li source according to a Li to Co ratio R between 1.04 and 1.06 to obtain a mixture, and
   firing said mixture with a single firing at a temperature T between 960° C. and 1020° C., whereby the quotient Q of the firing temperature T and the Li to Co ratio R corresponds to $920 \leq Q \leq 965$.

9. The single firing process of claim 8, wherein $1.04 \leq R \leq 1.05$ and $920 \leq Q \leq 960$.

10. The single firing process of claim 8, wherein $1.05 < R \leq 1.06$ and $925 \leq Q \leq 965$.

* * * * *